(12) United States Patent
Carlino et al.

(10) Patent No.: US 12,291,404 B2
(45) Date of Patent: May 6, 2025

(54) METHOD AND DEVICE FOR FEEDING ARTICLES

(71) Applicant: AZIONARIA COSTRUZIONI MACCHINE AUTOMATICHE A.C.M.A. S.P.A., Bologna (IT)

(72) Inventors: Francesco Carlino, Bologna (IT); Ivan Galvanetto, Bologna (IT); Maria Livia Melchionda, Bologna (IT); Domenico Polidori, Bologna (IT)

(73) Assignee: Azionaria Costruzioni Macchine Automatiche A.C.M.A. S.p.A., Bologna (IT)

( * ) Notice: Subject to any disclaimer, the term of this patent is extended or adjusted under 35 U.S.C. 154(b) by 83 days.

(21) Appl. No.: 18/028,595

(22) PCT Filed: Sep. 30, 2021

(86) PCT No.: PCT/IB2021/058982
§ 371 (c)(1),
(2) Date: Mar. 27, 2023

(87) PCT Pub. No.: WO2022/070123
PCT Pub. Date: Apr. 7, 2022

(65) Prior Publication Data
US 2023/0365347 A1  Nov. 16, 2023

(30) Foreign Application Priority Data
Sep. 30, 2020 (IT) .................. 102020000023044

(51) Int. Cl.
*B65G 47/68* (2006.01)
*B65B 23/12* (2006.01)
(Continued)

(52) U.S. Cl.
CPC ............ *B65G 47/684* (2013.01); *B65B 23/12* (2013.01); *B65B 25/005* (2013.01); *B65B 35/24* (2013.01);
(Continued)

(58) Field of Classification Search
CPC .......... B65G 1/02; B65G 1/04; B65G 47/684; B65G 2201/0202; B65G 41/002; B65B 23/12; B65B 35/24; B65B 25/005
(Continued)

(56) References Cited

U.S. PATENT DOCUMENTS 3,176,821 A * 4/1965 Eldred ................. B65G 47/684
198/453
3,465,868 A * 9/1969 Donner ................ B65G 47/682
198/444
(Continued)

FOREIGN PATENT DOCUMENTS

RU      2125011 C1      1/1999

OTHER PUBLICATIONS

International Seach Report and Written Opinion dated Jan. 31, 2022 from counterpart International Patent Application No. PCT/IB2021/058982.

*Primary Examiner* — James R Bidwell
(74) *Attorney, Agent, or Firm* — SHUTTLEWORTH & INGERSOLL, PLC; Timothy J. Klima

(57) ABSTRACT

A method for feeding articles includes the steps of: feeding transversally, by a first conveyor, a succession of parallel rows of articles to a transfer area; moving longitudinally, using a second conveyor, a succession of rows of articles from the transfer area; sending at least one row of articles, coming from the first conveyor, to a storage unit whilst the row of articles is fed transversely, preferably perpendicularly, to the row; transferring the row of articles inside the
(Continued)

storage unit, positioning the row of articles in a longitudinal direction at an outfeed section of the storage unit; extracting longitudinally portions in sequence of the row, portions formed preferably by one or more articles, from the storage unit and feeding the portions of row to the transfer area.

16 Claims, 4 Drawing Sheets

(51) Int. Cl.
  *B65B 25/00* (2006.01)
  *B65B 35/24* (2006.01)
  *B65G 41/00* (2006.01)
(52) U.S. Cl.
  CPC ...... *B65G 41/002* (2013.01); *B65G 2047/685* (2013.01); *B65G 2201/0202* (2013.01)

(58) Field of Classification Search
  USPC .......................................... 198/347.2, 347.3
  See application file for complete search history.

(56) References Cited

U.S. PATENT DOCUMENTS

| | | | | |
|---|---|---|---|---|
| 3,604,551 | A * | 9/1971 | Fink | B65G 47/684 |
| | | | | 198/453 |
| 5,489,016 | A * | 2/1996 | Welch | B65G 47/841 |
| | | | | 198/468.11 |
| 5,640,833 | A * | 6/1997 | Gerber | B65G 47/647 |
| | | | | 53/251 |
| 6,568,522 | B1 * | 5/2003 | Boelaars | B65G 47/5154 |
| | | | | 198/347.2 |
| 8,794,422 | B2 * | 8/2014 | Philipp | B65G 47/71 |
| | | | | 198/347.1 |
| 2010/0200370 | A1 | 8/2010 | Rausch et al. | |

* cited by examiner

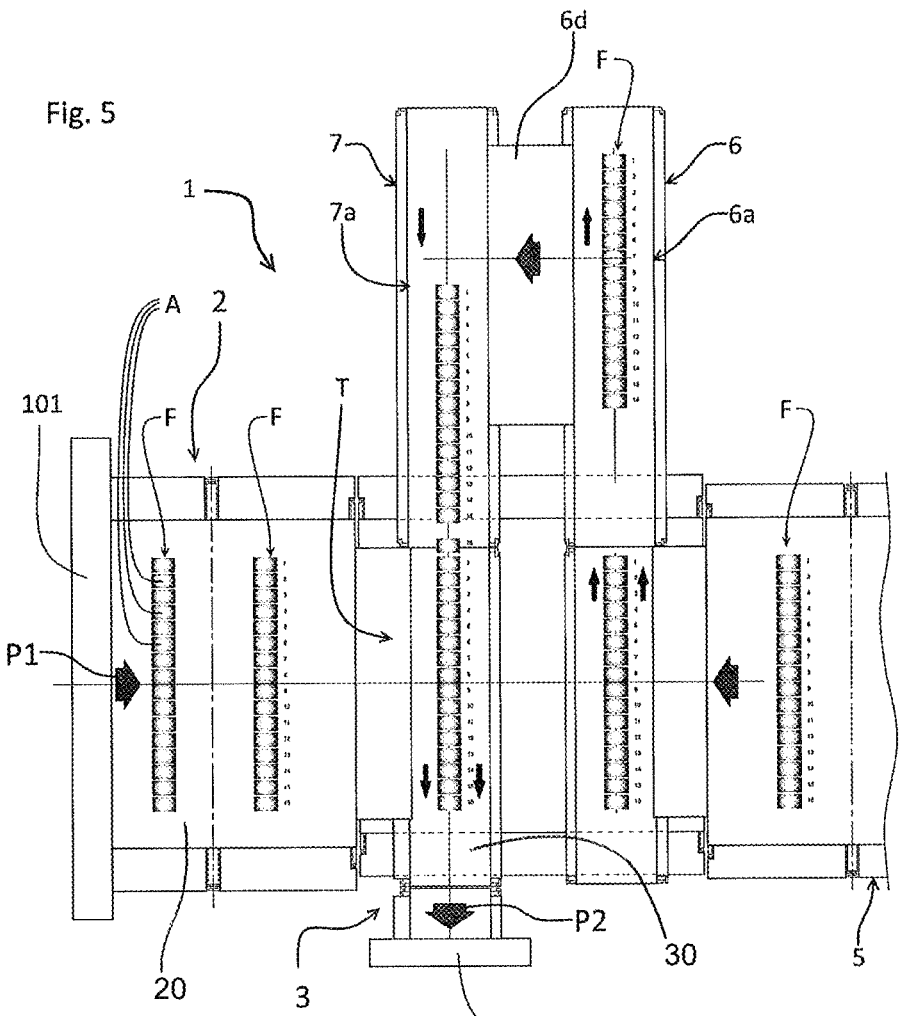
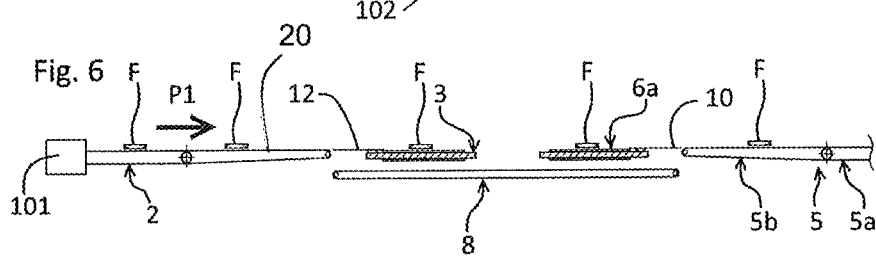

METHOD AND DEVICE FOR FEEDING ARTICLES

This application is the National Phase of International Application PCT/IB2021/058982 filed Sep. 30, 2021 which designated the U.S.

This application claims priority to Italian Patent Application No. 102020000023044 filed Sep. 30, 2020, which applications are incorporated by reference herein.

TECHNICAL FIELD

This invention relates to a method and a device for feeding articles.

In particular, the articles to which reference will be made below, without limiting the scope of the invention, are food products, for example confectionery products, each in the form of a substantially parallelepiped solid or in any case with a base which guarantees stability to the product.

In particular, the method and the device for feeding articles according to the invention comprise transporting the articles onto conveyors, for example belts or chains.

The term "articles", also referred to as "products", in particular food products, is used to mean confectionery products such as, for example, biscuits, chocolates, bars of chocolate, snacks or similar products, baked or modelled. However, the invention may also refer to non-foods articles, such as, for example, soaps or containers.

BACKGROUND ART

The devices for feeding articles present in the prior art are normally inserted in production lines in which production machines provide the articles positioned on a succession of parallel rows, which advance along a direction transversal to the rows of articles.

The rows of articles are then transferred by 90 degrees, parallel to themselves, to allow the articles to be positioned one after the other, in a single continuous row. In this way, the articles advance in a row at right angles to the direction of the parallel rows. This orthogonal direction allows the articles to be fed one after another to a wrapping machine, located downstream, which receives them one at a time, or in groups of articles aligned one after the other.

The production lines described above have a first drawback when there is a momentary interruption of the operation of the production machines. In fact, in this situation, a row or some parallel rows of articles are not fed to the machines downstream. This drawback therefore causes the wrapping machine located downstream to operate empty or be stopped. This increases the possibility of faults in the production line and a drop in its production capacity and efficiency.

The production lines described above also have a second drawback, even more serious than the previous one. In particular, when there is a momentary interruption or slowing down of the operation of the wrapping machine. In that case, the feeding of a row or several parallel rows of articles must be stopped until the operation of the wrapping machine is restarted. That drawback would cause the production machines to be blocked upstream and therefore the entire line to be stopped. This would therefore require the stopping of all the machines of the production line and would cause lengthy restarting times with the difficulty of restarting the production cycle of the articles, which is normally a continuous flow of operations and complex steps for making the products.

In order to make the production lines more efficient there are prior art intermediate storage units positioned between the production machines and the wrapping machines.

The term "storage unit" means a device for temporary accumulation of the articles, devices also known by the term "buffer", which indicates the buffer capacity of these devices in order to absorb the variations in production speed of the various units or machines which are inside a production line and which are positioned upstream or downstream of the storage unit itself.

These storage units allow the creation of accumulations of products, being able to increase or decrease their instantaneous storage capacity until it reaches its maximum capacity when the storage unit is full of products. The instantaneous capacity of the storage unit varies in particular when the productivity of at least one of the machines downstream or upstream of the storage unit itself is stopped or slowed down.

However, these prior art storage units, although positioned between the production machines and the wrapping machines along the production line, are most used by the wrapping machine and accumulate individual articles already arranged in a single continuous row immediately upstream of the wrapping machine. However, these storage units have the drawback of having a poor maximum storage capacity since they must maintain the sequence of the articles, keeping them arranged in a single row to release them in the same arrangement in which they have been received. The low maximum capacity often does not allow management of the stoppage times, of the machines upstream or downstream, which are long enough to allow an operator to perform the necessary maintenance operations to be performed during the machine stoppage. These storage units are only therefore used for actions for quickly restoring machine stoppages or production slow-downs.

There are also storage units which allow trays to be accumulated on which groups of articles are positioned, allowing a greater maximum capacity. However, in order to allow the emptying of these storage units they must wait for the production machine to be stopped upstream of them and which replace in line the trays previously picked up with the entire group of products.

Patent document U.S. Pat. No. 3,465,868 illustrates a device for forming a row of bottles starting from a disordered group of bottles, not ordered in rows, fed on a first conveyor. The row of bottles is formed on a second conveyor, downstream of the first conveyor, and the device comprises a collection surface which acts as a storage unit for the bottles between the first and the second conveyor.

AIM OF THE INVENTION

The aim of the invention is to provide a method and a device for feeding articles which overcome the above-mentioned drawbacks, in particular for articles positioned in a succession of parallel rows.

Another aim of the invention is to provide a method and a device for feeding articles which is capable of allowing lengthy stoppages since they have a very high maximum capacity for accumulating articles.

A further aim of the invention is to allow the storage unit to be emptied progressively during normal operation of the production line, without waiting for the production machine to be stopped upstream of the storage unit itself.

Yet another aim of the invention is to provide a method and a device for feeding articles, each in the form of a solid with a base which guarantees stability for resting the product, which are transported on conveyors, for example belts or chains.

The technical purpose indicated and the aims specified are substantially achieved by a method and a device for feeding articles comprising the technical features described in one or more of the appended claims. The dependent claims correspond to possible embodiments of the invention.

In particular, the technical purpose indicated and the aims specified are substantially achieved by a method for feeding articles comprising the step of feeding, using a first conveyor, a succession of parallel rows of articles to a transfer area, wherein said rows of articles are fed by the first conveyor along a first path transversal, preferably perpendicular, to the rows of articles. This step advantageously allows articles to be fed which have been produced by continuous machines for making rows of confectionery products.

Preferably, the method for feeding articles comprising the step of moving away, using a second conveyor, a succession of rows of articles from the transfer area along a second path parallel to the rows of articles. This step advantageously allows the articles to be moved away from each other so they are fed to a machine downstream.

Preferably, the method for feeding articles comprising the step of transferring, using a third conveyor, each row of articles from the first conveyor to the second conveyor, in particular by performing only a translation of the rows along the first path, without performing any rotation of the rows. This step advantageously allows the articles to be transferred without ruining them and without losing their positioning.

Preferably, the method for feeding articles comprising the step of sending at least one row of articles, coming from the first conveyor, to a storage unit whilst the row of articles is fed transversely, preferably perpendicularly, to the row. This step advantageously allows articles in excess for the machine downstream to be sent to in a storage unit without stopping the machine upstream.

Preferably, the method for feeding articles comprising the step of transferring the row of articles inside the storage unit positioning said row of articles aligned with the second path at an outfeed section of the storage unit. This step advantageously makes it possible to transfer the articles of the outfeed row oriented in the same direction as the articles which are then fed to the machine downstream.

Preferably, the method for feeding articles comprising the step of extracting portions in sequence of said row, portions formed preferably from one or more articles, from the storage unit feeding said portions of row to the transfer area along said second path. Preferably, the method for feeding articles comprising the step of extracting one or more articles of one row coming out of the storage unit to feed them to the machine downstream together with articles from another row coming from the machine upstream.

Preferably, the step of transferring the row of articles inside the storage unit positioning said row of articles aligned with the second path at an outfeed section of the storage unit is carried out without performing any rotation of the row but only by translation, preferably along directions at right angles to each other.

Preferably, the step of transferring the row of articles into the storage unit is carried out by means of at least two conveyors positioned perpendicularly to each other.

Preferably, the steps of sending at least one row of articles from the transfer area to the storage unit, transferring the row of articles inside the storage unit and extracting the portions of row in sequence from the storage unit feeding the portions of row to the transfer area are carried out along a transfer path which extends, in plan, along a closed line, preferably rectangular or square.

Preferably, the step of sending at least one row of articles to the storage unit is carried out using a conveyor positioned between the first conveyor and the storage unit and configured to bypass the transfer area, in particular passing above or below the transfer area.

Preferably, there is a step of performing a controlled diversion of the rows of articles coming from the first conveyor towards the second conveyor or the conveyor positioned between the first conveyor and the storage unit in such a way as to operate, selectively, an operational feeding of the rows of articles or a temporary storage of the rows of articles. The diverting step is performed preferably using an conveyor which can be oriented, in particular defining an end portion which can be oriented of the first conveyor.

Preferably, the step of sending at least one row of articles to the storage unit is carried out by sending to the storage unit a plurality of parallel rows of articles and, between the step of sending the rows of articles to the storage and the step of transferring the rows of articles inside the storage unit arranging the rows of articles in alignment with the second path at an outfeed section of the storage unit there is a sub-step of feeding a plurality of parallel rows inside the storage unit on a storage conveyor parallel to a direction for inserting the rows in the storage unit. The step of transferring the row of articles inside the storage unit by positioning the row of articles in alignment with the second path at an outfeed section of the storage unit is performed by picking up from the storage conveyor the last row of articles added and moving said row of articles towards the outfeed section of the storage unit. In other words, the storage unit operates with a logic of the "Last in-first out" type (known also with the acronym "LIFO"), that is to say, the last to enter the storage unit is the first to leave it.

Advantageously, each row extracted from the storage unit is added, entirely or partly with a portion of it, to one end of a respective row present in the transfer area and directly fed by a first conveyor, producing a single row on a second conveyor having an increased number of articles compared with a standard operation.

In other words, the method comprises selectively inserting in the storage unit the articles arranged in parallel rows along a direction transversal to each row.

In other words, the method comprises selectively picking up from the storage unit the articles positioned in each single row causing the articles to come out from the storage unit along a direction longitudinal to the row.

The technical purpose indicated and the aims specified are substantially achieved by a device for feeding articles which preferably comprises:
- a first conveyor configured for feeding a succession of parallel rows of articles to a transfer area along a first path transversal, preferably perpendicular, to the rows of articles;
- a second conveyor, configured for moving a succession of rows of articles away from the transfer area along a second path parallel to the rows of articles;
- a conveyor active in the transfer area for transferring each row of articles from the first conveyor to the second conveyor,
- a unit for storing parallel rows of articles into which the rows of articles are introduced along an infeed direction which is transversal, preferably perpendicular, to the rows;

a conveyor positioned between the first conveyor and the storage unit and configured to transversely feed the rows of products from the first conveyor to the storage unit.

The storage unit comprises at least one transfer conveyor, configured to transfer at least one row of articles into the storage unit, arranging said row of articles aligned with the second path at an outfeed section of the storage unit, and at least one extraction conveyor positioned at the outfeed section of the storage unit to extract portions in sequence of said row, portions formed preferably by one or more articles, from the storage unit feeding said portions of row to the transfer area along said second path.

Preferably, the storage unit comprises at least two transfer conveyors positioned perpendicularly to each other, of which a first transfer conveyor parallel to the second path and configured to move the rows of articles parallel to the rows themselves and a second transfer conveyor being perpendicular to the first transfer conveyor.

Preferably, the extraction conveyor is parallel and aligned with the second path and preferably adjacent to the transfer area, the second transfer conveyor being configured for transversal transfer of the rows from the first transfer conveyor to the extraction conveyor.

Preferably, the second transfer conveyor is positioned above the rows of articles and equipped with one or more movement blades facing downwards for intercepting the articles of the row and moving said articles of the row on a corresponding sliding plane.

Preferably, the transfer area is defined by at least one portion of the second conveyor.

Preferably, the conveyor between the first conveyor and the second conveyor is positioned above the transfer area and is equipped with one or more movement blades facing downwards for intercepting the articles of the row articles and moving said rows from the first conveyor to the second conveyor.

Preferably, the conveyor between the first conveyor and the storage unit defines a third path passing above or below the transfer area for bypassing the transfer area. Preferably, the third path is parallel to the first path.

Preferably, the first conveyor has an end portion which can be oriented to produce a controlled diversion of the rows of articles coming from the first conveyor towards the second conveyor or the conveyor between the first conveyor and the storage unit in such a way as to operate, selectively, an operational feeding of the rows of articles or a temporary storage of the rows of articles in the storage unit.

Preferably, the storage unit comprises a storage conveyor parallel to a direction of insertion of the rows in the storage unit and in particular parallel to the first path.

Preferably, the storage conveyor is adjacent to the first transfer conveyor to release in a controlled manner on the first transfer conveyor the last row of articles received on the storage conveyor.

Preferably, an end portion of the storage conveyor can be oriented to perform a controlled diversion between a storage configuration, wherein the end portion of the storage conveyor is positioned at the level of the conveyor positioned between the first conveyor and the storage unit to receive and store one or more rows of articles, and a release configuration, wherein the end portion of the storage conveyor is positioned at the level of the first transfer conveyor for releasing one or more rows of articles on the first transfer conveyor.

Further features and advantages of the invention are more apparent in the non-limiting description which follows of a non-exclusive embodiment of a method and a device for feeding articles.

BRIEF DESCRIPTION OF THE DRAWINGS

The description is set out below with reference to the accompanying drawings which are provided solely for purposes of illustration without restricting the scope of the invention and in which:

FIG. 5 is a schematic top view of a device according to the invention in a third operating step;

FIG. 6 is a schematic front view of the device in the third operating step of FIG. 5;

DETAILED DESCRIPTION OF PREFERRED EMBODIMENTS OF THE INVENTION

Figure 1:
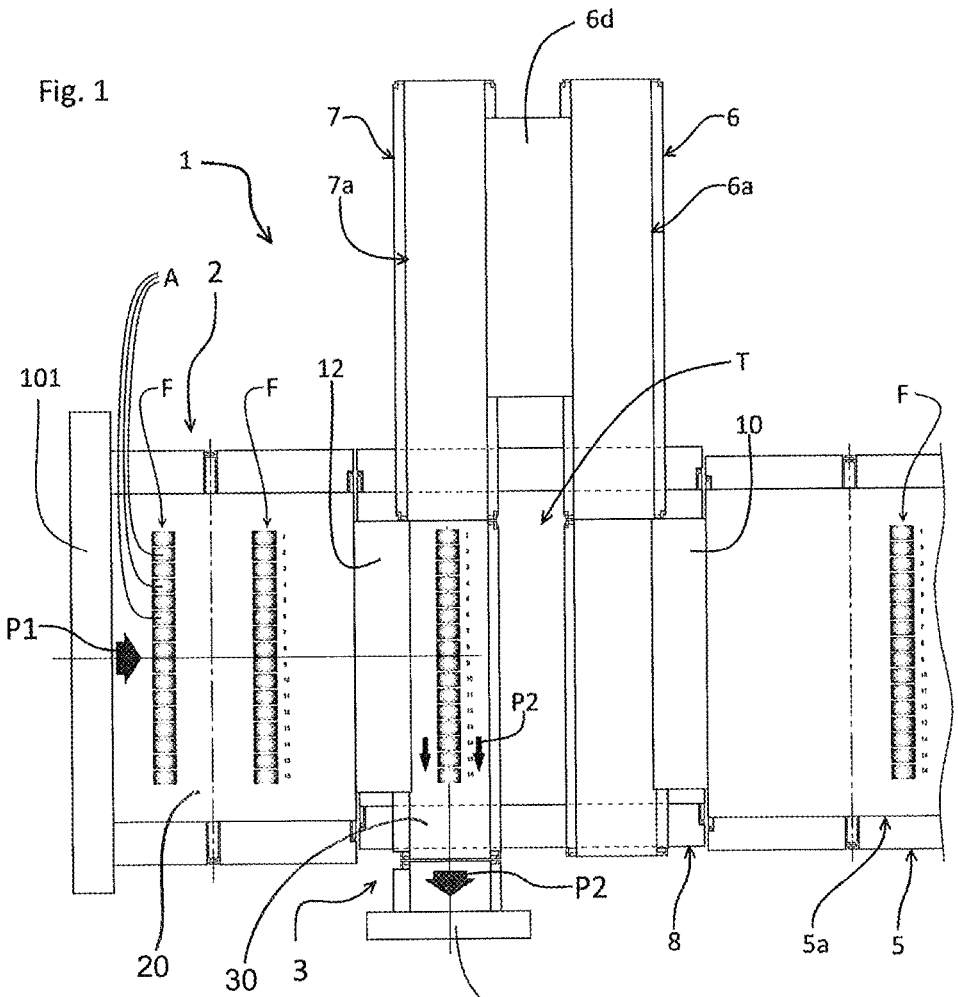
FIG. 1 is a schematic top view of a device according to the invention in a first operating step.

With reference to the accompanying drawings, the numeral 1 denotes in its entirety a device for feeding articles "A".

In particular, the term "A" articles, to which reference will hereinafter be made without thereby limiting the scope of the invention, may mean food products, for example confectionery products, each in the form of a substantially parallelepiped solid or in any case with a base which guarantees stability for resting the product. The term articles "A" is used to mean food products such as, for example, biscuits, chocolates, bars of chocolate, snacks or similar products, cooked in an oven or modelled. However, the invention may also refer to non-foods articles, such as, for example (not necessarily) soaps or containers.

The articles "A" are shown here in rows labelled "F", which consist of a plurality of articles "A", positioned in the same row "F" substantially aligned with each other and in such a way as to be substantially equidistant from each other, in such a way as to define between them a space and therefore be individually positioned in the row "F" at a distance from the adjacent articles "A".

The device 1 is normally inserted in a line for production of the articles "A" and, inside the production line, is installed downstream of a machine 101 for making the articles "A", the machine 101 represented schematically as a block.

Typically, inside the same production line, the device 1 is installed upstream of a machine 102 for wrapping the articles "A", the machine 102 is also represented schematically as a block.

The machine 102 for wrapping the articles "A" is located downstream of the machine 101 for making the articles "A", along the production line.

The articles "A" are therefore normally intended to be wrapped individually or in groups of certain articles "A" from the machine 102 before being picked up in containers or boxes to be transferred into the distribution circuits for sale.

Another possible use of the device 1 according to the invention might be that of being located upstream of a machine for using the articles "A", for example an overwrapping machine or a machine which is able to perform the processing operations on the articles "A" themselves. The wrapping machine 102 described here is therefore only one example and may be equivalent to any other type of machine which requires a storage unit upstream to optimise the flow of the articles "A" at its infeed.

The device 1 for feeding the articles "A" comprising a conveyor 2 configured for feeding a plurality of articles "A" positioned in rows "F" parallel to each other, along a first path "P1" transversal to the parallel rows "F", towards a transfer area "T".

Generally speaking, the term conveyor means a device or system, preferably automatic, designed to transport the articles "A"; the conveyors may be, for example, of the belt, rail and other type and are described below only insofar as necessary for understanding the invention and/or relative to their distinctive features.

The device 1 comprising a conveyor 3 configured to move the rows "F" of articles "A" away from the transfer area "T" along a second path "P2" longitudinal to the rows "F" themselves, therefore perpendicular to the first path "P1" (or, more generally, transversal to it). In this situation, the articles "A" moved by the conveyor 3 are positioned in a single row which can identify the individual rows "F", for example defining between the rows "F" a space greater than the space existing between the articles "A", or spacing the individual rows "F" from each other by a quantity equal to the space between the articles "A" of the same row "F".

Preferably, the conveyors 2, 3 comprise respective feed conveying units 20, 30, in particular linear conveyors, for example conveyor belts, chains, beds of rollers or the like. According to the embodiment illustrated, they normally lie horizontally.

The device 1 for feeding the articles "A" comprises a conveyor 4 (shown in FIG. 7) positioned in the transfer area "T" for transferring each parallel row "F" of articles from the conveyor 2 to the conveyor 3.

Preferably, the transfer area "T" is defined by at least one portion of the conveyor 3. In this situation, the conveying units 20, 30 of the conveyors 2, 3 are substantially in contact with or in any case very close to each other.

In order to correctly transfer the rows "F" between them, the conveyor 4 is advantageous which, in a preferred but non-limiting embodiment (illustrated in FIG. 7), is positioned above the transfer area "T" and is equipped with one or more blades 4a or other pushing elements facing downwards to intercept and push the rows "F" of articles "A" sliding, along the first path "P1". In particular, the blades 4a intercept the rows "F" on the conveyor 2, pushing them on a first compensation plane 12 and on the conveying unit 30 of the conveyor 3 to the desired position, for example aligned with receiving elements of the machine 102.

As shown in the plan view of FIG. 1, the conveying unit 20 is much larger than the conveying unit 30, since the first has to transport the rows "F" transversely while the second transports the rows "F" longitudinally, so it is sufficient for its width to be just greater than the width of the individual articles "A".

In accordance with the invention, the device 1 comprises a storage unit 5 configured for storing parallel rows "F" of articles A into which the rows F of articles A are introduced along an infeed direction which is transversal, preferably perpendicular, to the rows "F" and in particular parallel to the first path "P1". In the storage unit 5 the rows "F" are arranged one after another along the infeed direction. According to an embodiment, as shown in the accompanying drawings, the storage unit 5 comprises a storage conveyor 5a in the form of a belt conveyor, chain, bed of rollers or the like, having a direction of movement coinciding with the infeed direction and/or with the first path "P1".

It should be noted that the maximum capacity of the storage unit 5 depends on the length of the storage conveyor 5a which may be selected as desired and according to production requirements. The maximum capacity can be implemented by positioning a plurality of storage conveyors 5a in sequence, also selected from a variety of shapes.

Advantageously, the storage unit 5 is configured to release the rows "F", and more specifically portions of row "F" (preferably single articles "A"), in the transfer area "T" along a direction parallel and preferably aligned with the second path "P2", therefore perpendicularly to the infeed direction of the rows "F" in the storage unit 5.

According to the embodiment illustrated, the storage unit 5 comprises a transfer system 6 configured to transfer at least one row "F" of articles "A", preferably a succession of rows "F", present in the storage unit 5 positioning each row "F" of articles "A" in alignment with the second path "P2" at an outfeed section of the storage unit 5 (that is to say, at the transfer area "T" or any other conveyor which joins the outfeed section to the transfer area "T"). The system 6 operates preferably in a condition of emptying the storage unit 5.

As shown in FIGS. 1, 3, 5 and 9, according to an embodiment the system 6 may comprise a pair of transfer conveyors 6a, 6b positioned perpendicularly to each other. More in detail, the first transfer conveyor 6a is parallel to the second path "P2" and configured to move the rows "F" of articles "A" longitudinally to the rows "F"; the second transfer conveyor 6b is perpendicular to the first transfer conveyor 6a and therefore parallel to the first path "P1" (but in the direction opposite to the conveyor 2).

According to an embodiment, the first transfer conveyor 6a is configured to support the bottom of the articles "A", therefore in the form of a belt conveyor, chain, bed of rollers or the like (and which can be made by a single conveyor belt, for example, or alternatively, by two or more belts in succession, as in the embodiment illustrated, shown for example in FIG. 5).

According to an embodiment, the second transfer conveyor 6b is positioned above the rows "F" of articles "A" and equipped with one or more movement blades 6c facing downwards to intercept the articles "A" of the row "F" when they are still on the transfer conveyor 6a and move the articles "A" on a corresponding sliding plane 6d, for example a stationary supporting surface.

According to different embodiments not illustrated, the transfer system 6 may comprise more than two transfer conveyors interconnected for longitudinally releasing the rows "F" in the transfer area "T".

Advantageously, the storage unit 5 comprises, downstream of the transfer system 6 (where the latter positions the rows "F" already aligned with the second path "P2"), an extraction system 7 positioned at the outfeed section of the storage unit 5 to extract the above-mentioned portions in sequence of a row "F" of articles "A" already aligned with the second path "P2" from the transfer system 6 and to release the portions of row "F" to the transfer area "T" along the second path "P2".

The portions of a row "F" are formed preferably by one or more articles "A".

A row "F" may be released in its entirety, like a single portion. The entire row "F" feeding out of the storage unit may be released to the transfer area "T" along the second path "P2".

Figure 9:
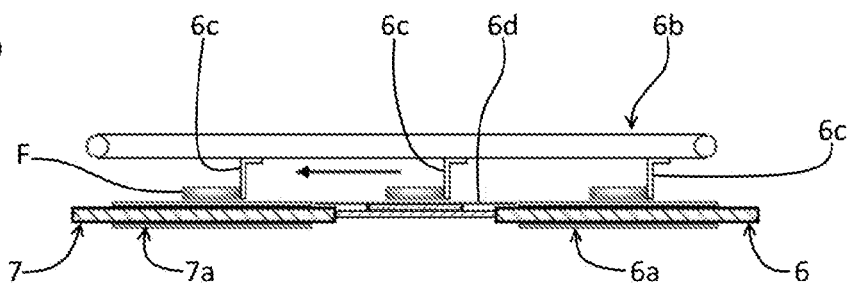
FIG. 9 is a schematic front view of a third part of the device with some parts in cross section and some parts not illustrated in order to better illustrate others.

The extraction system 7 preferably comprises an extraction conveyor 7a parallel and aligned with the second path "P2" and, preferably, adjacent to the transfer area "T" in such a way that the rows "F" of articles "A" can reach the transfer area "T" equipped with longitudinal movement. The extraction conveyor 7a is therefore parallel to the first transfer conveyor 6a and preferably level with it. In this situation, the second transfer conveyor 6b transversally transfers the rows "F" of articles "A" from the first transfer conveyor 6a to the extraction conveyor 7a, in particular by sliding on the above-mentioned sliding plane 6d by means of the blades 6c (FIG. 9).

Advantageously, the extraction system 7 is driven, in known manner and not illustrated, by a motor which enables the row "F" present on the extraction conveyor 7a to advance longitudinally to itself. The feeding of the row "F" may be controlled by the motor by a quantity such as to transfer one or more articles "A" onto the conveyor 3, thus defining the portion of articles "A". The portion of articles "A" will integrate a row "F" already present on the conveyor 3 for feeding in this way a row "F" with a number of articles "A" greater than normal. In this way, the release of individual articles "A" or of a plurality of them to the transfer area "T" may be performed without pushing elements but only by means of intermittent and controlled feeding of the extraction conveyor 7a.

Advantageously, according to an embodiment, the extraction system 7 may comprise pushing elements (not illustrated) configured to insert between adjacent articles "A" of the row "F" of articles "A" at the outfeed section of the storage unit 5 in such a way as to extract from the storage unit 5 and feed to the transfer area "T" only the desired articles "A", for example single articles "A" of the row "F". For example, the pushing means may be push blades of an upper conveyor (not illustrated).

In order to fill the storage unit 5, the device 1 comprises a conveyor 8 positioned between the conveyor 2 and the storage unit 5 and configured to transversely feed the rows "F" of articles "A" from the conveyor 2 to the storage unit 5.

Preferably, the conveyor 8 defines a third path "P3" passing above or below the transfer area "T", and preferably parallel to the first path "P1", for bypassing the transfer area "T" in such a way that the rows "F" can be directed to the storage unit 5 and not to the conveyor 3.

According to the embodiment illustrated, the conveyor 8 comprises a feed conveyor 8a lying flat, positioned below the transfer area "T".

Figure 10:
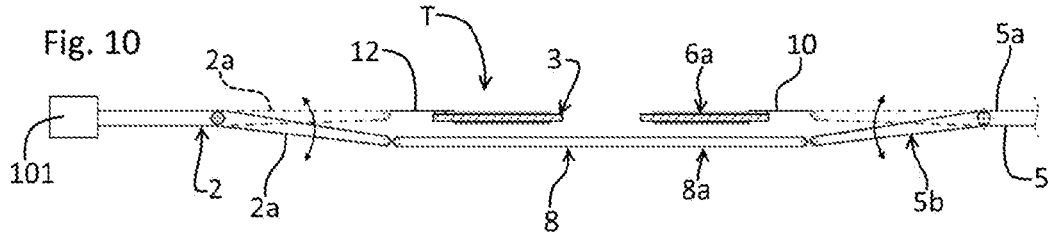
FIG. 10 is a schematic front view of the device according to the invention in two possible operating positions.

Preferably, the conveyor 2 has an end portion 2a which can be oriented during raising and lowering to produce a controlled diversion of the rows "F" of articles "A" coming from the conveyor 2, selectively, towards the conveyor 3 (FIG. 10, with a dashed line) or towards the conveyor 8 (FIG. 10, with a continuous line) in such a way as to carry out, respectively, an operational feeding of the rows "F" of articles "A" (that is to say, sending to the machine 102) or a temporary storage of the rows "F" of articles "A" inside the storage unit 5.

Similarly, at the outfeed from the conveyor 8, the storage conveyor 5a has an end portion 5b which can be oriented when raising and lowering to perform a controlled diversion between a storage configuration, wherein the end portion 5b of the storage conveyor 5a is positioned at the level of the conveyor 8 (FIG. 10, with continuous line) for receiving and storing one or more rows "F" of articles "A", and a release configuration, wherein the end portion 5b of the storage conveyor 5 is positioned at the level of the first transfer conveyor 6a (FIG. 10, with dashed line) to release one or more rows "F" of articles "A" on the first transfer conveyor 6a.

Figure 3:
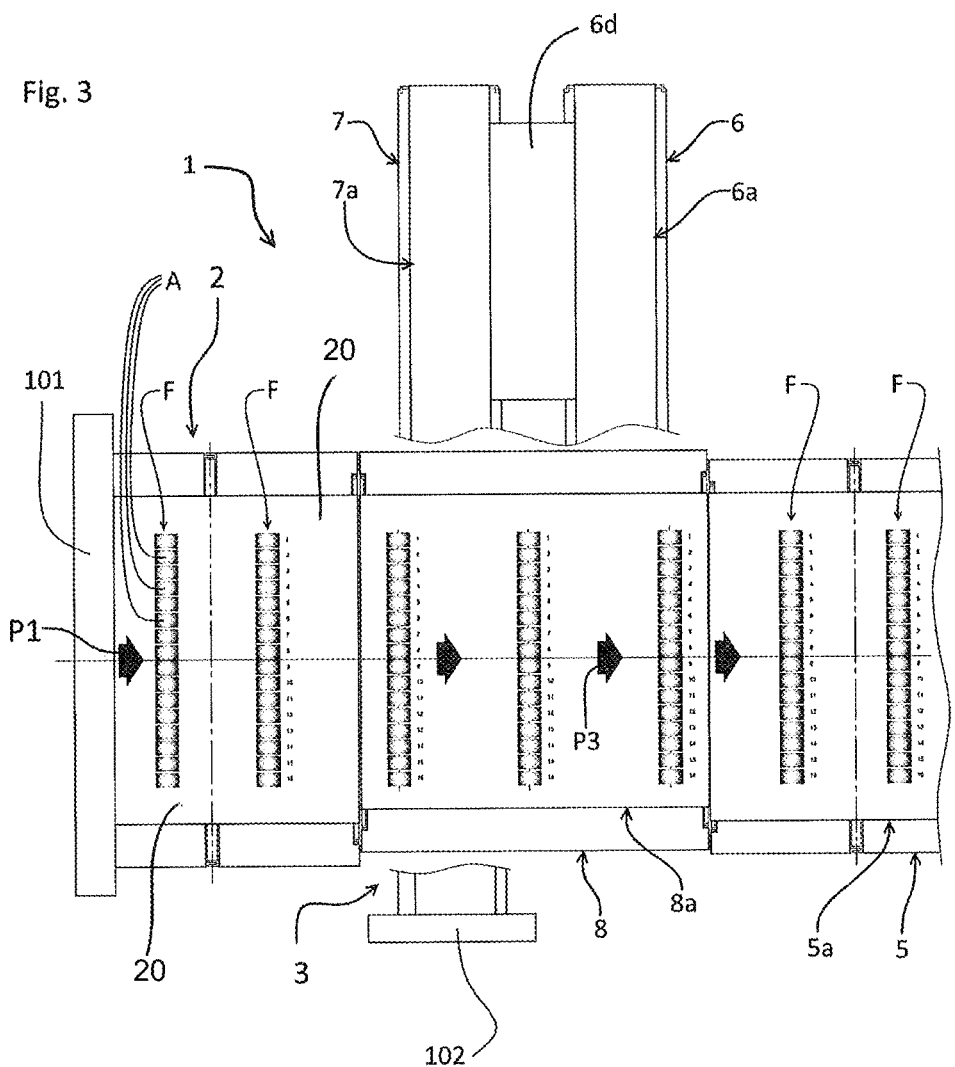
FIG. 3 is a schematic top view of a device according to the invention in a second operating step, with some parts cut away to better illustrate others.

As shown in FIGS. 1, 3 and 5, the transfer system 6 and the extraction system 7 extend, together, along a U-shaped trajectory and they, joined to the conveyor 8 and with a top view, define a path extending along a closed shape, in particular rectangular or square, even if with sides which are not on the same plane.

Figure 2:
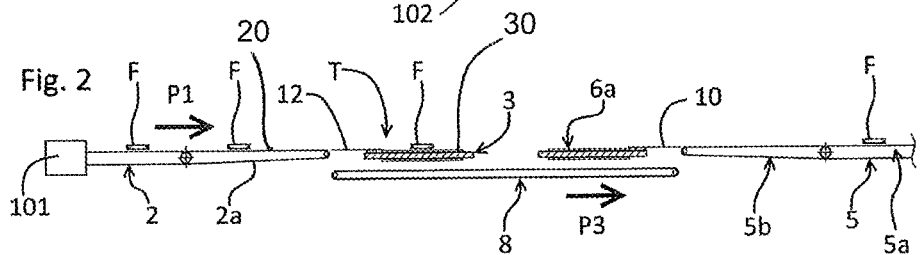
FIG. 2 is a schematic front view of the device in the first operating step of FIG. 1.
Figure 7:
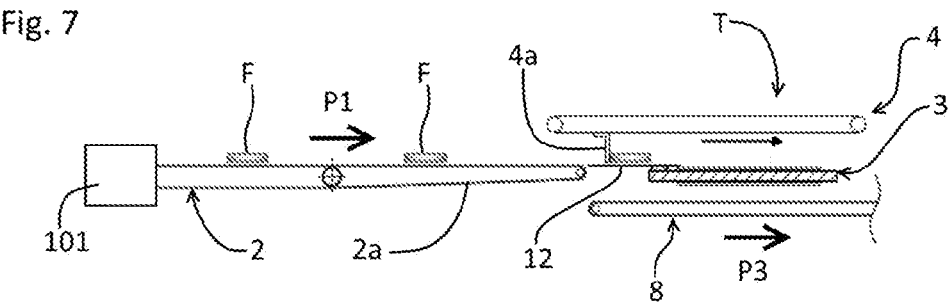
FIG. 7 is a schematic front view of a first part of the device with some parts in cross section and some parts not illustrated in order to better illustrate others.

In use, in a normal operating configuration (for example corresponding to a standard capacity or productivity of the machine 102), the rows "F" of articles "A", coming from the conveyor 2, are directed to the conveyor 3 through the transfer area "T" (FIGS. 1, 2 and 7). As shown in FIG. 7, the above-mentioned first compensation plane 12 may be positioned between the first and second conveyors 2, 3, in the form of conveyor belts.

Figure 4:
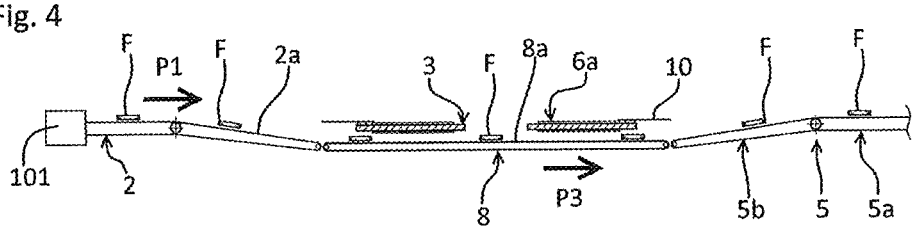
FIG. 4 is a schematic front view of the device in the second operating step of FIG. 3.

In a storage configuration (FIGS. 3, 4 and 10, with a continuous line), for example corresponding to the stopping of the machine 102, one or more rows "F" of articles "A", coming from the conveyor 2, are sent to the storage unit 5 whilst the rows "F" are fed transversally, preferably perpendicularly, to the rows "F" themselves.

In an "increased operation" configuration, for example upon restarting the operation of the machine 102 and/or when the latter is made to operate with a capacity or productivity which is slightly greater than the standard value, at the same time as normal feeding of the rows "F" of articles "A" from the first to the second conveyors 2, 3 a progressive emptying of the storage unit 5 is performed (FIGS. 5, 6, 8 and 9) by which one or more rows "F" of articles "A" are released from the storage unit 5 on the transfer system 6 and from this to the extraction system 7 in such a way that the sequence of rows "F" fed by the conveyor 2 to the conveyor 3 is integrated with portions of row "F", for example with individual articles "A" or with some of them, released by the extraction system 7. In this situation, the only row generated on the conveyor 3 has a number of articles "A" increased compared with the standard number of articles "A" present in a row "F". In particular, the number of articles "A" present on the conveyor 3 will be increased by a number equal to the number of articles "A" released by the extraction system 7.

Figure 8:
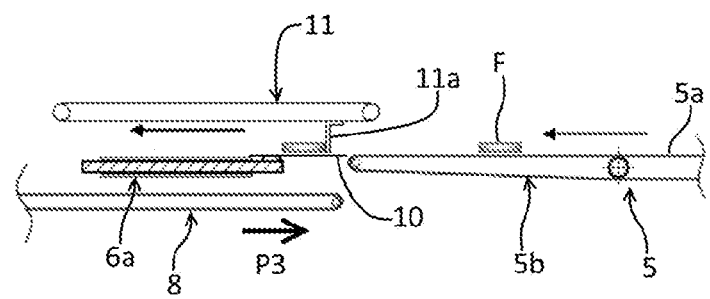
FIG. 8 is a schematic front view of a second part of the device with some parts in cross section and some parts not illustrated in order to better illustrate others.

Also in this situation, as shown in FIG. 8, between the storage conveyor 5a and the first transfer conveyor 6a, both made, for example, in the form of conveyor belts, there may be a second compensation plane 10, preferably stationary and identical to the first compensation plane 12, and/or there may be an upper pushing conveyor 11 equipped with lower blades 11a for intercepting the individual rows "F" of articles "A" coming from the storage conveyor 5a for releasing the rows on the first transfer conveyor 6a, in particular in a desired position.

It is clear that the storage unit 5 operates with a logic of the "LIFO" type, dispensing as the first row "F" the last row "F" of articles "A" released on the storage conveyor 5a, in particular by reversing the movement of the storage conveyor 5a relative to the storage configuration.

It should be noted that, according to an embodiment not illustrated, a storage unit could be used which operates with a "FIFO" (First In-First Out) logic, dispensing as the first row "F" the first row "F" of articles "A" stored, simply using an outfeed of the rows "F" on a conveyor different from the storage conveyor 5a. This would be possible, for example, with a storage unit in which there is at least one conveying stretch of the rows "F" which is substantially U-shaped.

The method and device for feeding the articles "A" as described above clearly shows how the technical problems identified are resolved according to the invention.

The advantages achieved by the feed device 1 described above, such as the increase in productivity of the production line, are also evident since, in the case of stopping or slowing down one of the automatic machines 101 or 102 present along the line, it is not necessary to stop the entire production line by storing the articles "A" which are not absorbed.

A further advantage consists in the fact that the machines 102 downstream of the storage unit 5 absorb the articles "A" previously stored, feeding the articles "A" one after the other and inserting them gradually, with portions of the rows "F", in the normal feeding of the articles "A" coming directly from the machine 101 located upstream.

All the aims and advantages described above and others are achieved preferably when the method is applied with the step of selectively inserting in the storage unit 5 the articles "A" positioned in parallel rows "F" in a direction transversal to each row "F" and, preferably, the step of selectively picking up from the storage unit 5 the articles "A" positioned in each single row "F" causing the articles "A" to come out of the storage unit according to a direction longitudinal to the row "F".

The invention claimed is:

1. A method for feeding articles comprising the steps of:
    feeding, using a first conveyor, a first succession of rows of articles being parallel to one another, to a transfer area, wherein said rows of articles are fed by said first conveyor along a first path transversal to the rows of articles;
    moving away, using a second conveyor, a second succession of the rows of articles as respective units from the transfer area along a second path parallel to the rows of articles;
    transferring, using a third conveyor, each of the rows of articles as respective units from the first conveyor to the second conveyor;
    sending at least one of the rows of articles as the respective units, coming from the first conveyor, to a storage unit whilst the at least one of the rows of articles is fed transversely to the at least one of the rows of articles;
    transferring the at least one of the rows of articles inside the storage unit, and positioning said at least one of the rows of articles aligned with the second path at an outfeed section of the storage unit;
    extracting from the storage unit portions in sequence of said at least one of the rows of articles, the portions formed by one or more of the articles in the at least one of the rows of articles, and feeding said portions to the transfer area along said second path.

2. The method according to claim 1, wherein each of the at least one of the rows of articles extracted from the storage unit is added, entirely or partly as a relative portion, to an end of a respective one of the rows of articles entirely present in the transfer area and directly fed by the first conveyor.

3. The method according to claim 1, wherein said step of transferring the at least one of the rows of articles inside the storage unit is carried out by at least two conveyors positioned perpendicularly to each other.

4. The method according to claim 1, wherein said steps of sending at least one of the rows of articles to the storage unit using the first conveyor, transferring the at least one of the prows of articles inside the storage unit and extracting from the storage unit the portions and feeding the portions to the transfer area are performed along a transfer path extending, in plan, along a closed line.

5. The method according to claim 1, wherein said step of sending at least one of the rows of articles to the storage unit is carried out using a fourth conveyor positioned between the first conveyor and the storage unit and configured to bypass said transfer area, said fourth conveyor defining a third feed path passing above or below the transfer area.

6. The method according to claim 5, comprising a step of controlled diversion of the rows of articles coming from the first conveyor towards the second conveyor or the fourth conveyor to carry out, selectively, an operative feeding of the rows of articles or a temporary storage of the rows of articles, said diversion step being actuated by an adjustable conveyor, defined by an adjustable end portion of the first conveyor.

7. The method according to claim 1, wherein said step of sending the at least one of the rows of articles to the storage unit is carried out by sending to the storage unit a plurality of parallel rows of the rows of articles, and wherein between the step of sending the rows of articles to the storage unit and the step of transferring the at least one of the rows of articles inside the storage unit and positioning said at least one of the rows of articles in alignment with the second path at an outfeed section of the storage unit there is a sub-step of feeding the plurality of parallel rows of the rows of articles inside the storage unit on a storage conveyor parallel to a direction of insertion of the parallel rows of articles in the storage unit; said step of transferring the at least one of the rows of articles inside the storage unit and positioning said at least one of the rows of articles in alignment with the second path at an outfeed section of the storage unit is performed by picking up from the storage conveyor the a last one of the parallel rows of articles added and moving said last one of the rows of articles towards the outfeed section of the storage unit.

8. A device for feeding articles, comprising
    a first conveyor configured for feeding a first succession of rows of articles being parallel to one another, to a transfer area along a first path transversal to the rows of articles;
    a second conveyor, configured for moving away a second succession of the rows of articles from the transfer area along a second path parallel to the rows of articles;
    a third conveyor active in the transfer area for transferring each of the rows of articles from the first conveyor to the second conveyor,
    a storage unit for storing parallel rows of articles into which the rows of articles are introduced along an infeed direction which is transversal to the rows;
    a fourth conveyor positioned between the first conveyor and the storage unit and configured to feed transversely the rows of articles from the first conveyor to the storage unit, and the storage unit comprising at least one transfer conveyor configured to transfer at least one of the rows of articles inside the storage unit, arranging said at least one of the rows of articles in alignment with the second path at an outfeed section of the storage unit, and at least one extraction conveyor positioned at the outfeed section of the storage unit to extract portions in sequence of said at least one of the rows of articles from the storage unit and feeding said portions to the transfer area along said second path.

9. The device according to claim 8, wherein said storage unit comprises at least two transfer conveyors positioned perpendicularly to each other, a first transfer conveyor being parallel to the second path and configured to move the at least one of the rows of articles parallel to the at least one of the rows of articles and a second transfer conveyor being perpendicular to the first transfer conveyor.

10. The device according to claim 9, wherein said extraction conveyor is parallel and aligned with the second path and adjacent to the transfer area, said second transfer conveyor being configured for achieving a transversal transfer of the rows of articles from the first transfer conveyor to the extraction conveyor; said second transfer conveyor being positioned above the rows of articles and including one or more movement blades facing downwards to intercept the articles of the rows of articles and move said articles of the rows of articles onto a corresponding sliding plane.

11. The device according to claim 8, wherein said transfer area is defined by at least one portion of said second conveyor; said third conveyor being located above the transfer area and comprising at least one movement blade facing downwards to intercept the articles of the rows of articles and move said rows of articles from the first conveyor to the second conveyor.

12. The device according to claim 8, wherein said fourth conveyor defines a third path passing above or below the transfer area for bypassing said transfer area, said third path being parallel to the first path; and wherein said first conveyor has an end portion which is movable for controlled diversion of the rows of articles coming from the first conveyor towards the second conveyor or towards the fourth conveyor to carry out, selectively, an operational feeding of the rows of articles or a temporary storage of the rows of articles inside the storage unit.

13. The device according to claim 9, wherein the storage unit comprises a storage conveyor parallel to a direction of insertion of the rows of articles in the storage unit and parallel to the first path, said storage conveyor being adjacent to the first transfer conveyor for releasing in a controlled fashion on the first transfer conveyor a last one of the rows of articles received on the storage conveyor.

14. The device according to claim 13, wherein an end portion of the storage conveyor is movable to perform a controlled diversion between a storage configuration, wherein the end portion of the storage conveyor is positioned at the level of the fourth conveyor for receiving and storing one or more of the rows of articles, and a release configuration, wherein the end portion of the storage conveyor is positioned at a level of the first transfer conveyor to release one or more of the rows of articles on the first transfer conveyor.

15. A method for feeding articles comprising the steps of:
feeding, using a first conveyor, a first succession of rows of articles being parallel to one another, to a transfer area, wherein said rows of articles are fed by said first conveyor along a first path transversal to the rows of articles;
moving away, using a second conveyor, a second succession of the rows of articles from the transfer area along a second path parallel to the rows of articles;
transferring, using a third conveyor, each of the rows of articles from the first conveyor to the second conveyor;
sending at least one of the rows of articles, coming from the first conveyor, to a storage unit whilst the at least one of the rows of articles is fed transversely to the at least one of the rows of articles
transferring the at least one of the rows of articles inside the storage unit, and positioning said at least one of the rows of articles aligned with the second path at an outfeed section of the storage unit;
extracting from the storage unit portions in sequence of said at least one of the rows of articles, the portions formed by one or more of the articles in the at least one of the rows of articles, and feeding said portions to the transfer area along said second path;
wherein said step of sending at least one of the rows of articles to the storage unit is carried out using a fourth conveyor positioned between the first conveyor and the storage unit and configured to bypass said transfer area, said fourth conveyor defining a third feed path passing above or below the transfer area.

16. The method according to claim 15, comprising a step of controlled diversion of the rows of articles coming from the first conveyor towards the second conveyor or the fourth conveyor to carry out, selectively, an operative feeding of the rows of articles or a temporary storage of the rows of articles, said diversion step being actuated by an adjustable conveyor, defined by an adjustable end portion of the first conveyor.

* * * * *